United States Patent [19]

Matthews

[11] Patent Number: 5,169,572
[45] Date of Patent: Dec. 8, 1992

[54] DENSIFICATION OF POWDER COMPACTS BY FAST PULSE HEATING UNDER PRESSURE

[76] Inventor: M. Dean Matthews, Box 24, Saratoga, Calif. 95071

[21] Appl. No.: 639,689

[22] Filed: Jan. 10, 1991

[51] Int. Cl.$^5$ .......................... H05B 1/00; B29C 67/00
[52] U.S. Cl. ...................................... 264/27; 264/102; 264/125
[58] Field of Search ................. 264/25, 26, 27, 102, 264/125, 332

[56] References Cited

U.S. PATENT DOCUMENTS

| | | | |
|---|---|---|---|
| 3,488,153 | 1/1970 | Bundy | 23/209.1 |
| 3,644,984 | 2/1972 | Inoue | 29/421.2 |
| 4,097,274 | 6/1978 | Bakul | 75/201 |
| 4,659,508 | 4/1987 | Higuchi | 252/516 |

OTHER PUBLICATIONS

B. Marchon, J. Carrazza, H. Heinemann, and G. A. Somorjai, Carbon, v 26, n 4, pp. 507–514, 1988.

F. P. Bundy, Journal of Chemical Physics, v38, n3, 1963, pp. 618–630; 631–643.

M. Shimada, Ceramic Bulletin, v.65, n8, 1986, pp. 1153–1155.

M. Shimada et al., Ceramics International, v8, n3, 1982, pp. 93–98.

M. Shimada et al., J. Am. Ceram. Soc., v68, n2, 1985 pp. C-38-C-40.

*Primary Examiner*—Jan H. Silbaugh
*Assistant Examiner*—Christopher A. Fiorilla

[57] ABSTRACT

A process for producing dense bodies from mixtures of materials with significantly different electrical resistivities. A mixture of electrically conducting powder and a dielectric or semiconducting powder is subjected to pressure and an intense electric current pulse of sufficiently short duration such that the heating is largely confined to the material of superior electrical conductivity. Densification is achieved under pressure prior to the attainment of thermal equilibrium within the mixture. Diamond/titanium diboride and boron carbide/titanium carbide composites are typical of the process.

6 Claims, No Drawings

5,169,572

DENSIFICATION OF POWDER COMPACTS BY FAST PULSE HEATING UNDER PRESSURE

BACKGROUND OF THE INVENTION

1. Field of the Invention

This invention relates to the process of achieving densification and/or phase changes in powder compacts through the application of pressure and an electric current pulse of short duration and high intensity.

2. Cross-Reference to Related Applications

This invention relates to a process that is carried out by means of equipment that is the subject of a prior patent application No. 07/622854 now U.S. Pat. No. 5,122,043 entitled "Electric Pulsed Power Vacuum Press" filed by M. Dean Matthews through his attorney Michael J. Hughes on Dec. 6, 1990. The equipment disclosed in the prior application is the preferred embodiment of equipment for implementing the process described herein.

DESCRIPTION OF THE PRIOR ART

The prior art of fast direct resistance heating of materials under high static pressure is exemplified by the work of Bundy as described in the *Journal of Chemical Physics, vol.* 38, *no.* 3, *pp.* 618–630 *and pp.* 631–643 and U.S. Pat. No. 3,488,153. Bundy demonstrates the capability for heating samples of graphite and mixtures of graphite and diamond under high static pressures using a low voltage capacitor bank. The electrical characteristics of the press and power supply were such that the duration of the applied pulses was on the order of milliseconds. The samples used by Bundy were approximately a millimeter in diameter and a millimeter in length. This combination of pulse duration and sample size will produce heating that is essentially adiabatic with respect to the sample and the sample container. In the strictest sense the heating is not adiabatic but quasi-adiabatic. Since heating of a body by the passage of electric current requires some finite period of time, some heat will flow from the body being heated into any dielectric material that is in contact with, or embedded in the conductive material. The distance that the heat penetrates by the end of the heating process can be estimated by calculating the thermal diffusion distance for the dielectric material. The thermal diffusion distance is equal to the square root of the product of the thermal diffusivity and the time duration of the heating process. Whether or not the heating of a dielectric/conductor composite can be described as quasi-adiabatic also depends upon the size and distribution of the two phases. I considering a conductive cylinder within an outer concentric dielectric cylinder, the heating could only be described as quasi-adiabatic if the radius of the inner cylinder were large compared to the thermal diffusion distance in the outer cylinder. If dielectric spheres of uniform size and distribution were embedded in the inner cylinder, the heating could only be described as quasi-adiabatic if the thermal diffusion distance in the spheres were small compared to the surface separation distance between the spheres.

For heating to be considered quasi-adiabatic, a large percentage of the heat generated in the conductive phase must still be contained in the conductive phase at the end of the current pulse. Thus, for a given pulse duration, there is a lower limit on the size of the particles that can be employed in a powder compact and still consider the heating in the conductive phase to be quasi-adiabatic. In reference to Bundy's system, the heating of a graphite cylinder surrounded by pyrophyllite was quasi-adiabatic, but the heating of a graphite cylinder with embedded diamond particles was not. The ability to achieve quasi-adiabatic heating on a fine scale with Bundy's equipment is limited by the pulse duration in excess of one millisecond.

Regardless of the type of power supply attached to Bundy's pressure equipment, the press structure in itself has too much inductance when considered for a fast pulse heating system as compared to the system disclosed by Matthews.

A further limitation of the system used by Bundy is the failure to exclude gaseous contaminants from the system. There are three sources of contaminants in the system. The first is the quantity of atmospheric gases that resides in the gaps and pores in the chamber assembly prior to pressing. The second is the adsorbed gases on the exposed surfaces. The third source is the pyrophyllite gasket that contains significant quantities of moisture.

In rapid thermal processing of materials, contaminants have very little time to segregate as they would under equilibrium conditions. Rapid melting and freezing require greater control of initial contamination.

Although Bundy's pulse heated system has been used to process materials such as diamond and boron nitride for research purposes, the bulk of hard refractory ceramics used for cutting tools and drawing dies are produced using the more conventional and more economical processes of hot pressing and pressureless sintering.

There are a great many industrially useful materials that can be fabricated from a combination of a dielectric or semiconductor phase and a conductive phase. Examples of dielectric or semiconductor refractory materials are: aluminum oxide, zirconium oxide, silicon carbide, silicon nitride, diamond and boron carbide. Examples of refractory materials serving as conductors are: titanium nitride, titanium carbide, titanium diboride, tungsten carbide, tantalum carbide, tantalum nitride, hafnium carbide, hafnium nitride, niobium carbide and niobium nitride. Due to the refractory nature of the starting materials, composites are usually produced by preparing powder compacts that are subjected to a given sequence of pressures and temperatures to achieve densification. The typical process is usually carried out at or near equilibrium conditions in the absence of large temperature gradients within the compact. Conventional processes are also characterized by process times on the order of minutes or hours. In some instances sintering aids may be added to enable densification at lower temperatures and pressures or in shorter times. Densification through the use of sintering aids is usually obtained at the expense of the properties of the material.

For example, silicon nitride is a refractory dielectric material that is used in cutting tools and turbines. Sintering and hot pressing of pure silicon nitride is quite difficult and as a result sintering aids are commonly used to obtain dense bodies. Shimada has covered the subject of silicon nitride densification in detail: *Ceramic Bulletin, vol.* 65 n8, 1986, *pp.* 1153-55, *Ceramics International, vol.* 8, *n*3, 1982, *pp.* 93-8, and *J. Am. Ceram. Soc.*, 68[2] C-38–C-40 (1985).

The production of electrically conductive silicon nitride is demonstrated in U.S. Pat. No. 4,659,508. This particular silicon nitride composite is novel in that it is machinable by electrical discharge machining due to the addition of titanium nitride or titanium carbide. However, it is still prepared using sintering aids.

The production of polycrystalline diamond compacts is an established art that must be carried out at either very high pressures, or moderate to high pressures and short temperature duration in order to avoid graphitization of the diamond. The use of moderate to high pressure and short temperature duration is demonstrated by U.S. Pat. No. 4,097,274. In this process, heating rates are less than 1000 K/second and the peak temperature dwell is on the order of minutes.

In spite of the fact that prior art recognizes the benefits of rapid heating and peak temperatures of short duration, the concept and means of quasi-adiabatic heating on a fine scale through very high power pulse heating has not been considered for the production of refractory bodies. In addition, the contamination problems associated with rapid thermal processing have not been adequately addressed.

SUMMARY OF THE INVENTION

The invention provides a method for achieving densification of and/or a phase change within a composite of conductive and dielectric or semiconductor materials. In the method of the invention, conductive and dielectric or semiconductor powders are mixed in proportion corresponding to the desired final product and placed in an electrically insulated die. The die is then subjected to vacuum, time and temperature sufficient to remove adsorbed moisture and other contaminants.

After cooling to room temperature pressure is applied to the sample within the die to produce intimate packing of the constituent powders. The powder compact is then subjected to a high current electric pulse of less than 50 milliseconds. The power supply and press delivering the pulse are so designed such that the conductive phase will be heated to the desired temperature with a minimum of heat being lost to the dielectric phase and die wall. Densification will then proceed by one of two mechanisms. The first mechanism is the softening or melting of the conductive phase, allowing the conductive phase to flow between the dielectric particles thus filling the voids. The second mechanism is the softening or melting of the dielectric phase at points of contact with the heated conductive phase and the subsequent flow of the softened or melted portion of the dielectric phase to fill the voids. In either case, densification of the compact is complete prior to thermal equilibrium being achieved between the dielectric and conductive phases. After cooling and removal from the die, the compact is then ready for final heat treatment or shaping, for example annealing or electrical discharge machining.

The invention also comprises conductor/dielectric and conductor/semiconductor composites made using the method of the invention.

Although the invention is preferably used to make composites of conductive and dielectric materials, the invention may be used to produce a single phase material from a starting mixture of conductive, semiconductor and dielectric phases.

The invention can also be used to convert a conductive phase of a material to a dielectric phase of the same material, for example the conversion of graphite to diamond.

OBJECTS AND ADVANTAGES

It is the object of the invention to provide materials such as dense dielectric/conductor composites, by a new method that is characterized by extremely fast, quasi-adiabatic heating and the achievement of densification prior to the attainment of thermal equilibrium between the conductive, semiconductor and dielectric phases.

It is a further object of the invention to provide for the growth of diamond upon a low temperature diamond seed crystal by embedding said seed crystal in graphite and rapidly melting the surrounding graphite. At the proper pressure, the seed crystal will serve both as a heat sink and nucleation site for the cooling liquid carbon without graphitization.

It is also an object of the invention to provide a method of removing adsorbed contaminants such as moisture, hydrogen, oxygen and other gases from the powder compact prior to and during the application of pressure.

It is a further object of the invention to produce dense refractory ceramic composites without the use of sintering aids, for example, silicon nitride and titanium nitride.

One advantage of the invention is the efficient use of electrical energy. Due to the extremely rapid heating, energy losses to the surrounding die are minimized.

A further advantage is that due to the internal heat capacity of the dielectric phase and the rapid heating, the equilibrium temperature of the compact is lower than the peak temperature of the conductive phase, thus reducing the thermal loading of the die. This in turn allows for more economical die construction and a greater range of operating parameters.

Another advantage is the rapid densification due to the extreme local heating achieved in the material mixture, with densification times on the order of seconds instead of minutes or hours.

A further advantage is the rapid cooling attainable that allows for quenching of materials from the molten state to produce metastable solid solutions that can subsequently be heat treated to produce useful microstructures. This rapid cooling is afforded by the quasi-adiabatic heating and the local heat sink capability of the semiconductor or dielectric material.

Further objects and advantages of the invention will become apparent from a consideration of the preferred embodiments.

PREFERRED EMBODIMENTS

The method of the invention comprises a technique for achieving densification of and/or a phase change in a mixture of dielectric and electrically conductive powders comprising the steps of: (a) mixing two materials with significantly different electrical resistivities; (b) placing the materials in an electrically insulated die; (c) applying a vacuum to the die while heating to a temperature sufficient to remove adsorbed moisture and atmospheric gases; (d) allowing the mixture to cool to room temperature; (e) applying pressure to the materials; (f) applying an electric pulse to the materials; (g) reducing the applied pressure and allowing the material to cool.

In the preferred embodiment mixing of the materials to provide uniform distribution of the dielectric and conductive phases is generally desired.

It is preferred that the electrical resistivities of the two materials differ by a factor of at least one thousand.

Preferably, the die containing the sample should be refractory in nature and not subject to rapid reaction with the enclosed materials.

In the preferred embodiment the vacuum applied for outgassing should be on the order of $10^{-4}$ Pa.

It is preferable that the current source be a Marx generator, capacitor bank or homopolar generator.

It is preferred that the applied pressure be sufficient to produce a fully dense body and prevent undesirable phase changes.

In the preferred embodiment the capacitance, inductance, resistance of the current source, press structure and material being pressed are selected to provide an equivalent circuit path that allows for a short pulse duration to minimize heat loss to the dielectric phase before completion of the pulse.

It is also preferred that the energy of the pulse be sufficient to melt or soften the conductive phase in the compact or produce a temperature in the conductive phase that is sufficient to produce local melting or softening of the dielectric phase in contact with the conductive phase during subsequent heat transfer between the phases.

In the preferred embodiment, the combination of applied pressure, pulse energy and pulse duration should be sufficient to cause densification of the material prior to the attainment of local thermal equilibrium between the phases.

It is preferable but not necessary in all cases that the pressure be reduced in a controlled fashion immediately after thermal equilibrium is achieved in the material in order to reduce the mechanical stress on the die assembly that absorbs heat from the material during cooling.

The invention is illustrated in the following examples, but the examples do not serve to limit the invention to the particular combination shown. The physical equipment used to carry out the invention is itself the subject of a prior patent application. The equipment referred to is described in the application entitled "Electric Pulsed Power Vacuum Press" filed by M. Dean Matthews through his attorney Michael J. Hughes on Dec. 6, 1990. The preferred design and materials of construction for the equipment are described in the aforementioned application.

EXAMPLE 1

PREPARATION OF DIAMOND/TITANIUM DIBORIDE COMPOSITE

Preparation of composites between diamond and refractory ceramics is difficult because of the tendency of diamond to graphitize at high temperatures and low pressures. By using moderate pressure and extremely fast heating, a non-friable compact of titanium diboride and diamond was obtained.

0.03 grams of 40-60 micron diamond powder and 0.02 grams of $-325$ mesh titanium diboride were mixed and placed in a one eighth inch diameter sample die. a capacitor bank of 136 microfarads was charged to a voltage of 1600 volts. After pumping to a vacuum of about 130 Pa, a pressure of 73 MPa was applied. After the application of pressure, the capacitor bank was discharged. Upon removal from the die, the outer portion of the compact was found to be friable with the core exhibiting a degree of strength.

EXAMPLE 2

PREPARATION OF TITANIUM CARBIDE/BORON CARBIDE COMPOSITE

A mixture of approximately 50% titanium carbide/50% boron carbide by volume was pressed at 40 MPa in a 3 mm diameter die under a vacuum of approximately 10 Pa. A capacitor bank of 68 microfarads was charged to 4800 volts and discharged through the sample. The resulting compact was non-friable and exhibited a degree of strength.

It will be understood by those skilled in the art that various modifications and alterations may be made to the invention without departing from the scope and spirit thereof.

It will also be recognized that the invention has a number of applications, particularly in the fabrication of refractory composites.

I claim:

1. A process for making an article from at least one first material consisting of an electrical conductor and at least one second material wherein said second material is a dielectric or semiconductor, comprising the steps of:
   (a) preparing a powder mixture of said first material and said second material;
   (b) placing said powder mixture in an electrically insulated die;
   (c) applying a vacuum to said die by a means of a vacuum chamber enclosure while heating to a temperature sufficient to remove adsorbed gases;
   (d) allowing said powder mixture to cool to room temperature;
   (e) applying sufficient pressure to said powder mixture by means of a low inductance press structure to produce intimate packing of said powder mixture;
   (f) applying an electric current pulse of less than 50 milliseconds to the packed powder mixture by means of said low inductance press structure such that said first material is heated and heat loss from said first material to said second material is minimized prior to completion of said pulse, and densification of the packed powder occurs and is complete prior to thermal equilibrium being achieved between said first and second materials;
   (g) allowing the resulting densified article to cool;
   (h) removing said pressure;
   (i) restoring said vacuum chamber to atmospheric pressure;
   (j) removing said densified article from said die.

2. The process of claim 1 wherein said first material consists primarily of one selected from the group consisting of: titanium nitride, titanium carbide, titanium diboride, tungsten carbide, tantalum carbide, tantalum nitride, hafnium carbide, hafnium nitride, niobium carbide, and niobium nitride; and said second material consists primarily of one selected from the group consisting of: aluminum oxide, zirconium oxide, silicon carbide, silicon carbide, silicon nitride, diamond and boron carbide.

3. The process of claim 1 wherein the pressure is reduced in a controlled fashion immediately after the attainment of thermal equilibrium in said mixture.

4. The process of claim 1 wherein said first material is substantially melted by said electric current pulse.

5. The process of claim 4 wherein said first material is graphite and said second material is diamond.

6. The process of claim 4 wherein the heat loss to said second material after the completion of said electric current pulse is sufficiently rapid to produce a metastable solid solution upon cooling of the substantially melted said first material.

* * * * *